United States Patent [19]
Imai

[11] Patent Number: 5,283,600
[45] Date of Patent: Feb. 1, 1994

[54] LCD PROJECTOR

[75] Inventor: Masao Imai, Tokyo, Japan

[73] Assignee: NEC Corporation, Japan

[21] Appl. No.: 20,563

[22] Filed: Feb. 22, 1993

[30] Foreign Application Priority Data

Feb. 21, 1992 [JP] Japan .................. 4-033821

[51] Int. Cl.$^5$ ............................ G02F 1/13
[52] U.S. Cl. ..................... 353/34; 353/33; 353/37; 353/20; 359/40; 359/48
[58] Field of Search ............ 353/20, 31, 33, 34, 353/37, 81; 359/40, 48, 63, 70

[56] References Cited

U.S. PATENT DOCUMENTS

| | | | |
|---|---|---|---|
| 4,913,529 | 4/1990 | Goldenberg et al. | 353/81 |
| 5,042,921 | 8/1991 | Sato et al. | 359/40 |
| 5,153,752 | 10/1992 | Kurematsu et al. | 353/31 |
| 5,172,254 | 12/1992 | Atarashi et al. | 359/40 |
| 5,200,843 | 4/1993 | Karasawa et al. | 353/20 |

FOREIGN PATENT DOCUMENTS

| | | | |
|---|---|---|---|
| 0121821 | 5/1988 | Japan | 359/40 |
| 0039084 | 2/1990 | Japan | 359/40 |
| 0221917 | 9/1991 | Japan | 359/40 |
| 4-04051031 | 2/1992 | Japan | 353/33 |
| 4-04097146 | 3/1992 | Japan | 353/33 |

OTHER PUBLICATIONS

Proceedings of Eurodisplay 1990, Report of The Tenth International Display Research Conference, pp. 64 through 67.

Primary Examiner—William A. Cuchlinski, Jr.
Assistant Examiner—William C. Dowling
Attorney, Agent, or Firm—Ostrolenk, Faber, Gerb & Soffen

[57] ABSTRACT

An LCD projector for projecting an image displayed on an LCD of the electrooptic-effect type on a projection screen is disclosed. The LCD projector has a polarization beam-splitting optical system which is disposed in the optical path of a projection beam between a light source and the LCD. The optical system has a plurality of optical subsystems and at least one optical rotator. Each optical subsystem has a reflecting device and a polarization beam splitter arrangement provided with a polarization beam-splitting plane arrangement. The polarization beam splitter arrangement and the beam-splitting plane arrangement are arrangements of one or more polarization beam splitters and of one or more polarization beam-splitting planes, respectively. The beam-splitting plane arrangements provided in the plurality of optical subsystems are disposed in the optical path of the projection beam and oriented with respect to the projection beam so as to define planes of incidence parallel to each other. The reflecting device is made up of one or more reflectors oriented so that the s-polarized component reflected on the polarization beam-splitting plane arrangement is deflected toward a prescribed region of the incidence surface of the LCD. The optical rotator makes parallel the directions of the s- and p-polarized components delivered from the optical system.

18 Claims, 13 Drawing Sheets

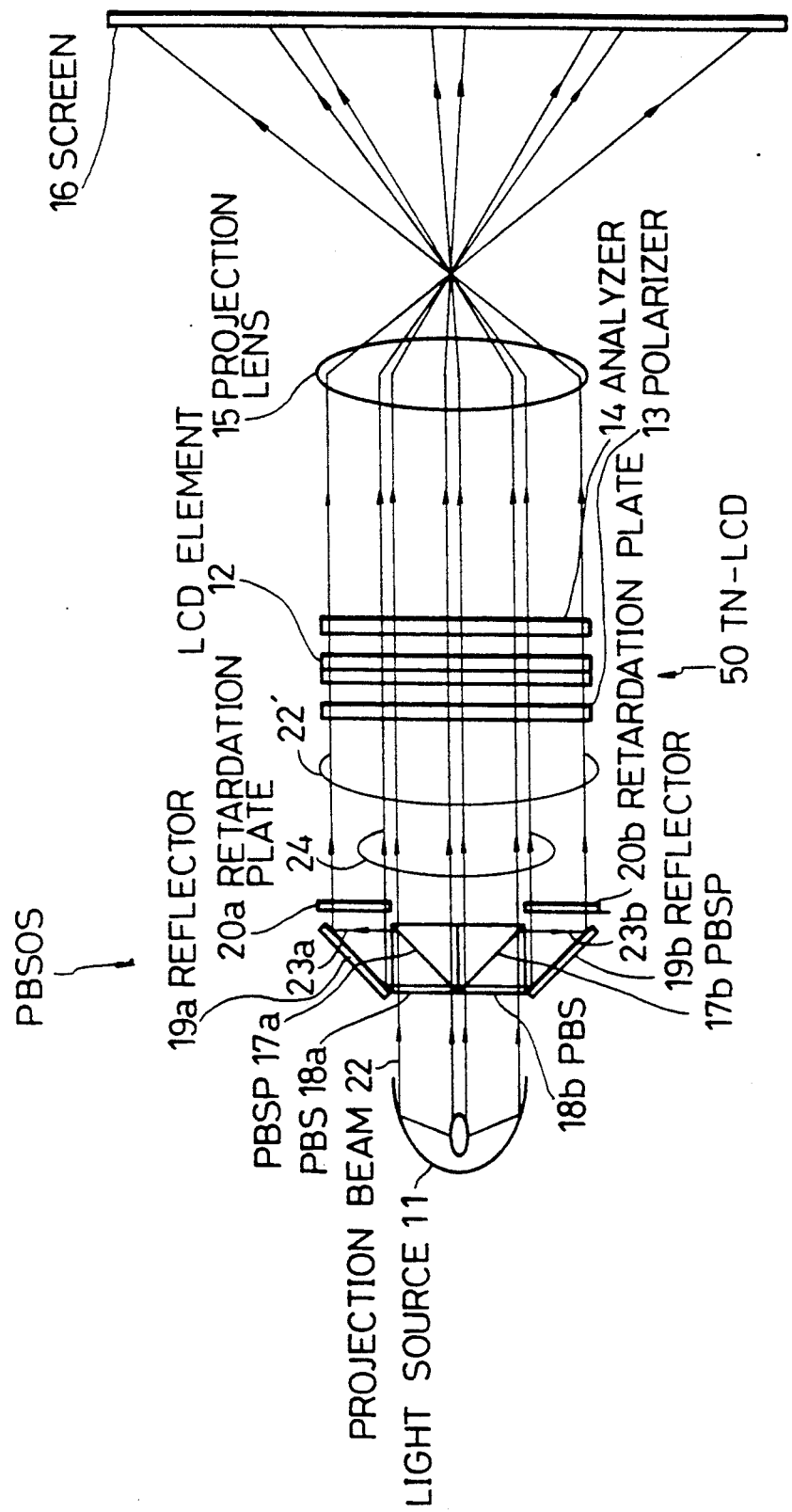

LCD PROJECTOR

BACKGROUND OF THE INVENTION

1. Field of the invention

The present invention relates to an LCD (liquid crystal display) projector to project an enlarged picture of an image displayed on an LCD to a projection screen.

2. Description of the related art

LCD projectors have been of wide interest because of their compactness and ease of installation. FIG. 1 shows an example of a prior art LCD projector. The LCD projector is basically made up of light source 51, LCD element (hereafter, referred to as LCD) 52 and projection lens 55. In the case that a twisted-nematic (TN) mode LCD is used as LCD element 52, polarizer 53 and analyzer 54 are arranged in front of and behind LCD 52, respectively. The arrangement is shown as TN-LCD 50 in FIG. 1. Light source 51 is composed of a parabolic mirror and a lamp located at the focus of the mirror, thereby emitting a light beam parallel to the optical axis of the parabolic mirror. The beam will be referred to as projection beam 57 below. The component of projection beam 57 polarized parallel to the optic axis of polarizer 53, when it is incident on polarizer 53, undergoes intensity modulation corresponding to the display image generated on LCD 52. The major part of the perpendicularly polarized component, however, is absorbed by polarizer 53, thereby causing heat generation.

It has been common, in order to obtain a projected picture of high contrast and high quality, that LCD 52 is made of an active matrix of pixels, each provided with a switching element. While LCD 52 has the advantage of allowing a large-sized projection picture to be readily obtained with a small-sized LCD, a problem is that the switching elements and opaque electrode films provided in the active matrix prevent transmission of projection beam 57 through LCD 52, which deteriorates the light-utilization efficiency of the LCD projector, thus causing the projected picture to be dark or less luminant.

While the failure in luminance of the projected picture described above may be remedied by using a bright light source, the use of a bright light source causes another problem when the TN-LCD is used: since the perpendicular component of the projection beam (the light component polarized perpendicular to the optic axis of polarizer 53) is absorbed by polarizer 53 causing heat generation which increases as the light source is brighter, the bright light source causes deterioration of the polarizer due to a temperature rise caused by heat generation.

In order to solve this problem, S. Shikama et al. presented a novel polarization beam-splitting optical device, published in Proceedings of Eurodisplay 1990, Report of The Tenth International Display Research Conference, pages 64 through 67. FIG. 2 shows the optical layout of the Shikama et al. optical device. The optical device is made up of polarization beam splitter (PBS) 61, mirror 62 and halfwave plate 63. PBS 61 has polarization beam-splitting plane (PBSP) 64, which is oriented with respect to projection beam 57 so that the plane of incidence is parallel to the optic axis of polarizer 53. Thus the p-polarized component of projection beam 57 transmitted through PBSP 64 passes through polarizer 53. Mirror 62 is disposed on the optical path of the s-polarized component reflected on PBSP 64 and is oriented so that the s-polarized component is deflected toward the predetermined region of the incidence surface of polarizer 53. Halfwave plate 63 is disposed in the optical path of the s-polarized component reflected on mirror 62 with its optic axis making an angle of 45° with the direction of polarization of the s-polarized component. Thus the s-polarized component is optically rotated to be a p-polarized light, which is then transmitted through polarizer 53. The advantages of the Shikama et al. optical device are that, since approximately 99% of projection beam 57 is delivered from their polarization beam-splitting optical device as a p-polarized beam, the brightness of the projected image is markedly improved, and that, since the s-polarized component impinged on polarizer 53 is only a small part of projection beam 57, heat generation in the polarizer due to absorption of the perpendicular component becomes far less, which allows a high intensity light source to be used without any substantial temperature rise.

While the Shikama et al. optical device provides a way of obtaining a bright projection image, a further problem has been left unsolved related to the illuminance distribution on the incidence surface of LCD element 52. FIG. 3 shows diagrams for illustrating the manner of illuminating the incidence surface of TN-LCD 50 in the LCD projector shown in FIG. 1: FIG. 3(A) is a plan view illustrating the optical path of projection beam 57, FIG. 3(B) illustrates the light-utilization efficiency for an oblong incidence surface, and FIG. 3(C) shows the illuminance curve on the same surface as FIG. 3(B).

Projection beam 57 emitted from light source 51 is perpendicularly incident on the incidence surface of TN-LCD 50 with an optical path parallel to the axis of the parabolic mirror. Since projection beam 57 has a circular cross section, the part of projection beam 57 surplus to the incidence surface (hatched with oblique lines in FIG. 3(B)) is unutilized to illuminate LCD 52. This unutilized part of projection beam 57 increases as the shape of the incidence surface differs from that of the incident-beam cross section on the incidence surface. Hereafter, the former and latter shapes will be referred to as the incidence-surface shape and the incident-beam shape, respectively. In FIG. 3(B), the incidence-surface shape is an oblong rectangle and the incident-beam shape is a circle.

It has been widely known that, when an image is projected on a large projection screen, use of an oblong or wide screen as used in a movie is preferable, because this wide projection do not cause watchers to be fatigued and serves to make a forceful impression on the watchers as well as to appeal to their emotions. This is the case in a television image plane. Specifically, a high-definition television receiver, which is capable of producing a high-quality and high-resolution image, has an image plane of an aspect ratio of 9 : 16, more oblong than the aspect ratio 3 : 4 adopted in an ordinary television receiver.

When wide projection is desired in an LCD projector, an LCD element with an oblong rectangular image plane is employed. In this case, projection beam 57 has to have a cross-sectional diameter equal to or larger than that of the circumscribed circle of the incidence surface in order that the whole incidence surface is illuminated, as shown in FIG. 3(B). Since the part of the projection beam outside the oblong rectangular incidence surface, i.e., the part unutilized for image projection, increases as the aspect ratio of the incidence surface deviates from 1, light utilization efficiency decreases, this an average illuminance of the incidence surface decreases as the incidence surface becomes more oblong. Further, since the circumscribed circle diameter for a constant area of the incidence surface increases as the aspect ratio deviates from 1, the difference between the illuminances in the central and side regions of the incidence surface tends to be more prominent, as the incidence plane is more oblong, as is seen from FIG. 3(C). This difference in illuminance causes a difference in luminance of the projected picture, further causing the quality of the projected picture to be lowered.

SUMMARY OF THE INVENTION

It is an object of the present invention to provide an LCD projector adapted for wide projection capable of effecting high light-utilization efficiency of a projecting beam and uniform illuminance of the incidence surface of the LCD element.

In order to attain the object above, the first LCD projector according to the present invention includes a polarization beam-splitting optical system disposed in the optical path of a parallel projection beam between a light source and said LCD. This polarization beam-splitting optical system comprises a plurality of optical subsystems and at least one means for optical rotation, each of the optical subsystems having reflector means and polarization beam splitter means provided with polarization beam-splitting plane means, the polarization beam-splitting plane means transmitting the p-polarized component and reflecting the s-polarized component of an incident beam and the reflector means being disposed outside the optical path of the projection beam and arranged so as to deflect the optical path of the s-polarized component reflected on the polarization beam-splitting plane means to a prescribed region of the incidence surface of the LCD, the plurality of optical subsystems being arranged so that the polarization beam-splitting plane means included therein are disposed in the optical path of the projection beam and oriented with respect to the projection beam so as to define planes of incidence parallel to each other, and the means for optical rotation being disposed between the plurality of optical subsystems and the LCD and optically rotating at least one of the s-polarized component and the p-polarized component to make parallel the directions of polarization of the two components emerging from the plurality of optical subsystems.

In order to attain the object above, the second LCD projector according to the present invention includes a polarization beam-splitting optical system disposed in the optical path of a parallel projection beam between a light source and said LCD. The polarization beam-splitting optical system comprises a plurality of optical subsystems, each of the optical subsystems having first polarization beam splitter means provided with first polarization beam-splitting plane means which transmits the p-polarized component and reflecting the s-polarized component of an incident beam, the first polarization beam-splitting plane means being disposed in the optical path of the projection beam and oriented with respect to the projection beam so as to define a predetermined first plane of incidence, second polarization beam splitter means provided with second polarization beam-splitting plane means disposed outside the optical path of the projection beam and arranged in the optical path of the s-polarized component of the projection beam reflected on the first polarization beam-splitting plane means, the second polarization beam-splitting plane means being oriented with respect to the optical path of the s-polarized component so as to define a second plane of incidence parallel to the first plane of incidence, means for optical rotation capable of optically rotating an incident light beam by 90° when the incident light beam transmits both ways through the means for optical rotation, the means for optical rotation being disposed in the optical path of the s-polarized component reflected on the second polarization beam-splitting plane means, reflector means for reflecting the light beam transmitted through the means for optical rotation again to the polarization beam-splitting plane means through the means for optical rotation, the reflector means being arranged so that the plane of reflection of the light beam is parallel to the second plane of incidence.

The above and other objects, features, and advantages of the present invention will become apparent from the following description referring to the accompanying drawings which illustrate examples of preferred embodiments of the present invention.

BRIEF EXPLANATION OF THE DRAWINGS

FIG. 3 shows diagrams for illustrating the manner of illuminating the incidence surface of TN-LCD 50 in the LCD projector shown in FIG 1.

FIG. 4 is a plan view of the LCD projector according to the first embodiment of the present invention.

FIG. 5 shows diagrams illustrating the operation of the LCD projector shown in FIG. 4.

FIG. 11 shows diagrams illustrating the manner of operation of the LCD projector shown in FIG. 10.

DETAILED DESCRIPTION OF THE PREFERRED EMBODIMENTS

Figure 1:
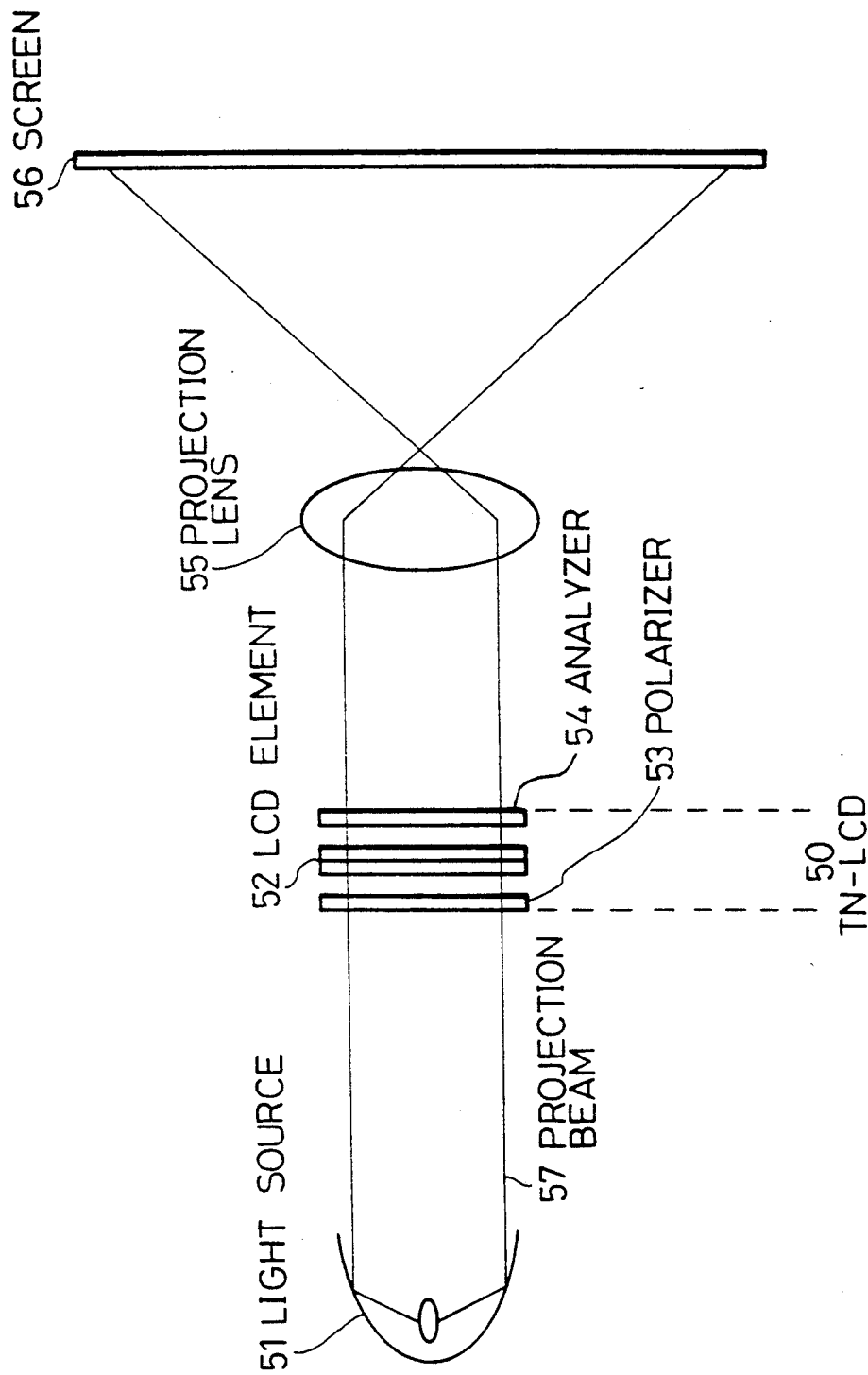
FIG. 1 shows an example of a prior art LCD projector.
Figure 2:
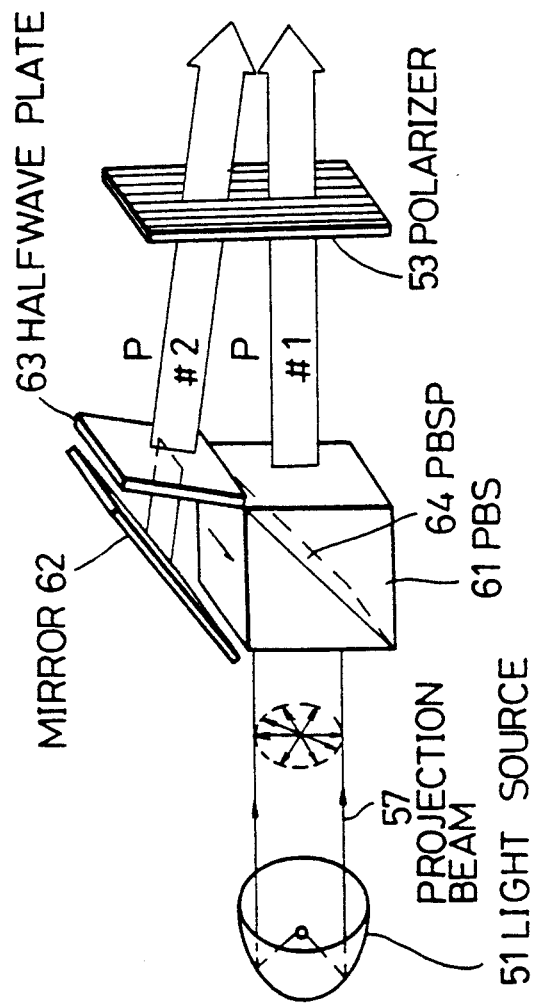
FIG. 2 shows the optical layout of the Shikama et al. optical device.

Preferred embodiments of the present invention will be described below with reference to the drawings.

FIG. 4 is a plan view of the LCD projector according to the first embodiment of the present invention. The LCD projector comprises light source 11, a polarization beam-splitting optical system (PBSOS), polarizer 13, LCD element 12, analyzer 14, and projection lens 15. Light source 11 has a parabolic mirror and a 250W metal halide lamp positioned at the focal point of the parabolic mirror. A parallel light beam emitted from light source 11 is incident on a cold mirror and is passed through an ultraviolet rejection filter (the cold mirror and the filter are not shown), by which light components other than the visible light are removed.

The polarization beam-splitting optical system comprises retardation plate 20a, 20b and two optical subsystems, each of which has a polarization beam splitter and a reflector (18a, 19a), (18b, 19b). Polarization beam splitters 18a, 18b are made up of two right angle prisms with slanting surfaces joined to each other, wherein one of the slanting surfaces is coated in advance with a semitransparent film of dielectric multilayers acting as polarization beam-splitting plane (PBSP) 17a, 17b. Each of polarization beam splitters 18a, 18b is sufficiently capable of splitting natural light in the visible wavelength range into p-polarized and s-polarized components, with the extinction ratio, i.e., the intensity ratio of p- and s-polarized components of the transmitted light, being 100 : 1 or higher. The incidence and exit surfaces of each of the polarization beam splitters 18a, 18b are coated with antireflection films of dielectric multilayers.

The two optical subsystems are arranged symmetrically with respect to the plane of symmetry including the optical axis of light source 11, with polarization beam-splitting planes 17a, 17b disposed in the optical path of projection beam 22 and oriented with respect to projection beam so as to define planes of incidence parallel to each other. The parallelism in the planes of incidence ensures that the p-polarized components of projection beam 22 transmitted through polarization beam-splitting planes 17a, 17b have directions of polarization parallel to each other. In this embodiment, polarization beam splitters 18a, 18b are joined to each other so that polarization beam-splitting planes 17a, 17b join orthogonally to each other, and are arranged so that the normals of polarization beam-splitting planes 17a, 17b make an angle of incidence of 45° with projection beam 22.

As reflectors 19a, 19b, aluminum surface mirrors are employed, which are produced by depositing aluminum on a glass substrate by vaporization and then applying reflection-increasing coating of dielectric multilayers on the surface. Reflectors 19a, 19b will hereinafter referred to as mirrors 19a, 19b, respectively. Mirrors 19a, 19b are disposed outside the optical path of projection beam 22, arranged in the optical paths of the s-polarized component 23a, 23b reflected on polarization beam-splitting planes 17a, 17b, respectively, and oriented so as to deflect the s-polarized component toward a prescribed side region of the incidence surface of TN-LCD 50.

Each of retardation plates 20a, 20b employed is a film of polyvinyl alcohol stretched to have desired birefringence characteristics in order to act as a halfwave plate, sandwiched between a pair of glass substrates. Retardation plates 20a, 20b have entrance and exit surfaces coated with antireflection films of dielectric multilayers. In this embodiment, retardation plates 20a, 20b are disposed in the optical paths of s-polarized beams reflected by mirrors 19a, 19b, respectively, with their optic axes slanted by 45° with respect to the direction of polarization of the s-polarized beams. Accordingly, the s-polarized beams that have passed through retardation plates 20a, 20b are converted to p-polarized beams, and are propagated to prescribed side regions of the incidence surface of TN-LCD 50.

LCD element 12 has a liquid crystal sealed between two glass substrates coated with transparent electrode films forming pixels. The voltage to be applied to each pixel is controlled by video signals delivered from a video signal processing circuit and an LCD driving circuit not shown in the figure. Since the liquid crystal used is a twisted-nematric mode (TN) liquid crystal, a variation of the molecular orientation generated depending on the voltage applied to each pixel causes optical rotation of projection beam 22', which causes by means of polarizer 13 and analyzer 14 an intensity modulation of projection beam 22' corresponding to the image to be displayed. The liquid crystal is driven by an active matrix system in which the liquid crystal is driven by thin-film transistors acting as switching elements provided individually to each pixel. The aspect ratio of the image plane of LCD element 12 in this embodiment is 9 : 16.

Each of polarizer 13 and analyzer 14 used is a polarizing plate adhered to a surface of a glass substrate. The polarizing plate has a polarizing film with triacetate films adhered to both surfaces for protection, wherein the polarizing film is made of a polyvinyl alcohol film with iodine adsorbed, the iodine molecule being oriented to the polyvinyl alcohol molecule. The surface of the glass substrate to which the polarizing plate is not adhered is coated with an antireflection film of dielectric multilayers.

Projection lens 15 serves both to enlarge the image displayed by LCD element 12 and to project the image onto screen 16. Projection lens 15 has a focusing mechanism for adjusting the focus of the projected picture and a zooming mechanism for varying the size of the projected picture without varying the projection distance through which the image is projected.

Figure 5A:
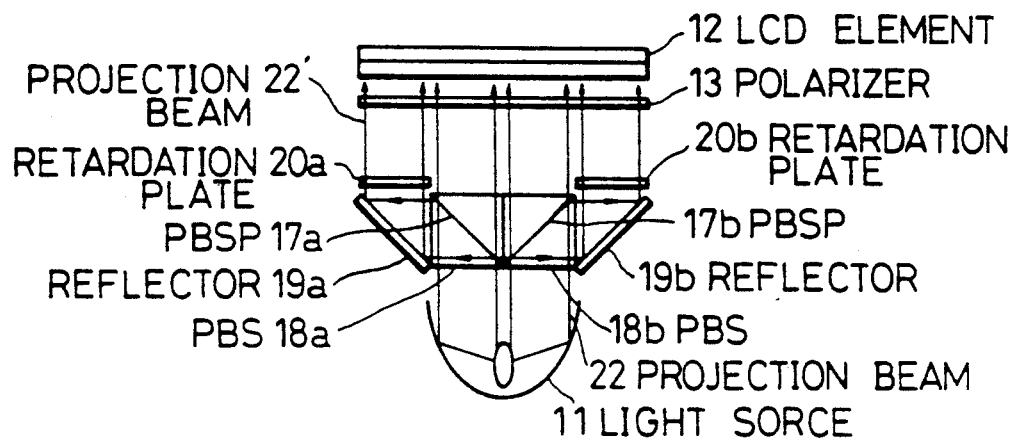
FIG. 5(A) is a plan view of the part of the device between light source 11 and LCD 12.
Figure 5B:
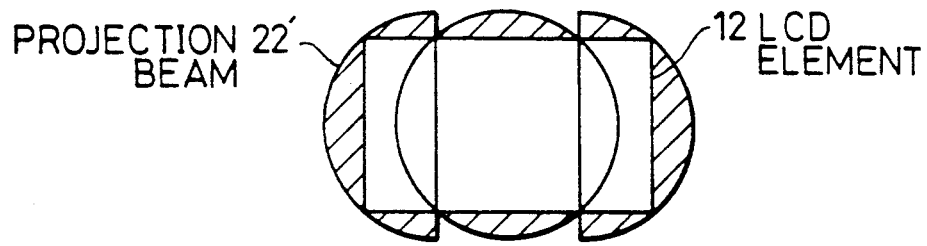
FIG. 5(B) shows a cross section of projection beam 22' in the incidence surface of TN-LCD 50.
Figure 5C:
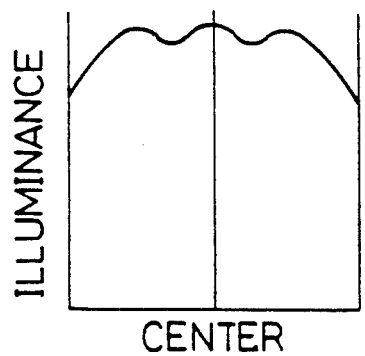
FIG. 5(C) shows the illuminance distribution curve of projection beam 22' on the incidence surface.

FIGS. 5(A) through (C) are diagrams illustrating the operation of the LCD projector shown in FIG. 4. FIG. 5(A) is a plan view of the part of the device between light source 11 and LCD element 12. FIG. 5(B) shows a cross section of projection beam 22' on the incidence surface of TN-LCD 50. FIG. 5(C) shows the illuminance distribution curve of projection beam 22' on the incidence surface.

Figure 3A:
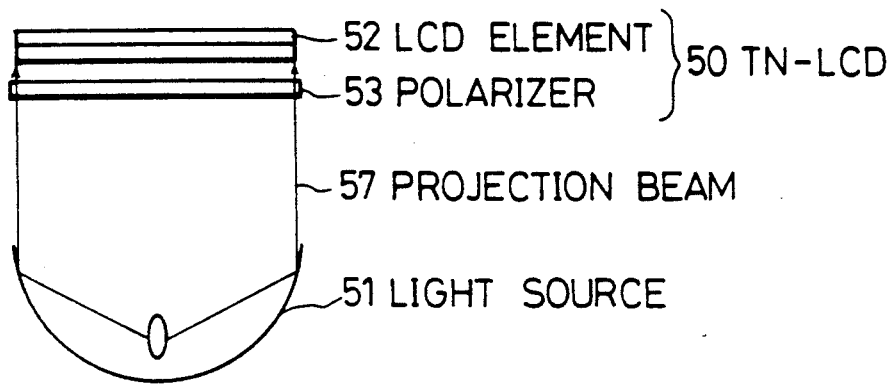
FIG. 3(A) is a plan view illustrating the optical path of the projection beam.

The light beam emitted from light source 11 is split into two orthogonal linearly polarized components p, s by polarization beam-splitting planes 17a, 17b of polarization beam splitters 18a, 18b, respectively. The p-polarized component passes through polarization beam-splitting planes 17a, 17b, and illuminates LCD element 12. The s-polarized component is reflected by polarization beam-splitting planes 17a, 17b, reflected again by mirrors 19a, 19b, passes through retardation plates 20a, 20b, and then illuminates LCD element 12. Retardation plates 20a, 20b, which are halfwave plates, optically rotate the direction of polarization of the linearly polarized light by 90°. Accordingly, the s-polarized light is converted into p-polarized light by retardation plates 20a, 20b. As a result, the light beam emitted from light source 11 is approximately entirely converted into linearly polarized light having the same direction of polarization before impinging on the incidence surface. Comparison with the LCD projector shown in FIG. 3(A) shows that the efficiency of converting projection beam 22 into unidirectionally polarized projection beam 22, is almost doubled, resulting in an increase in light-utilization efficiency, and that absorption of light by polarizer 13 is reduced to about 1/6, whereby a substantial rise in temperature of polarizer 13 is avoided. Hence, polarizer 13 is free from deterioration which would otherwise cause lowering of the quality of the projected picture.

Figure 3B:
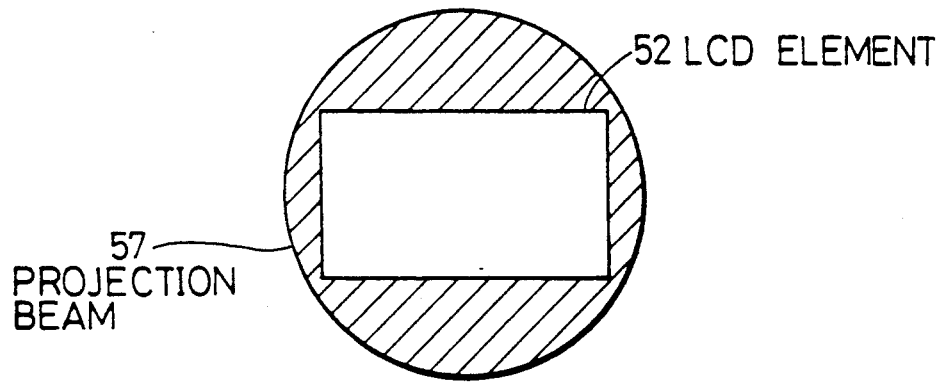
FIG. 3(B) illustrates the light-utilization efficiency for an oblong incidence surface and FIG. 3(C) shows the illuminance distribution curve on the same surface as FIG. 3(B)).
Figure 3C:
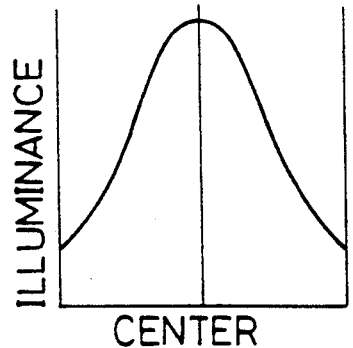

Since projection beam 22' incident on LCD element 12 is composed of the p-polarized component 24 having passed through polarization beam splitters 18a, 18b and the p-polarized light resulting from the s-polarized light optically rotated by retardation plates 20a, 20b, the cross section of unidirectionally polarized projection beam 22' becomes oblong as shown in FIG. 5(B). In FIG. 5(B), areas shown hatched are portions of the projection beam that are not incident on LCD element 12. The ratio of the unhatched area to the entire cross sectional area is larger than that in FIG. 3(B), which represents an increase in light-utilization efficiency of the projection beam. While the intensity distribution of projection beam 22 is typically higher at its central region and lower at its peripheral region, as shown in FIG. 3(C), since the s-polarized component of the intense central part of projection beam 22 illuminates both side regions of the incidence surface, the illuminance distribution of the projection beam 22' according to this embodiment is improved to be uniform compared to that shown in FIG. 3(C), as represented in FIG. 5(C).

As described above, the polarization beam-splitting optical system in this embodiment allows p-polarized beam 24 and s-polarized light beams 23a, 23b to make projection beam 22' have an oblong cross section. Accordingly, the unutilized part of the projection beam for wide projection is reduced, and the illuminance difference between the central and side regions is also reduced, thus ensuring high light-utilization efficiency and uniform luminance of the wide projection.

Compared with the conventional LCD projector, luminance at the central region of the screen is 1.5 times and luminance at the peripheral region of the screen is 2.5 times, resulting in increases in both luminance and uniformity of luminance. Further, in the conventional LCD projector, when a 250W metal halide lamp is used as the light source, the polarizer gradually deteriolates, causing contrast and brightness of the projected picture, particularly in the central region of the screen, to be lowered, and further causing projected colors to differ between the central and peripheral regions of the screen. In this embodiment, however, no deterioration in the quality of the projected image is observed.

In the illustrated embodiment, halfwave plates are positioned as retardation plates 20a, 20b in the optical paths of the s-polarized beams. However, they may be positioned in the optical paths of the p-polarized beams. In this case, the optic axes of polarizer 13 and analyzer 14 are rotated by 90°. Alternatively, the retardation plates may be positioned in the optical paths of both the s-polarized component and the p-polarized component. In this case, polarizations of both components can be made parallel by using halfwave plates as the retardation plates with their optic axes inclined by +22.5° and −22.5° with respect to the directions of polarizations of the s- and p-polarized components, respectively. It is also possible to have the polarizations of both components directed parallel by using as the retardation plates two pairs of quarter-wave plates with the optic axes of the two quarter-wave plates of each pair angularly shifted by 45°. In the alternative examples described above, polarizer 13 and analyzer 14 are arranged with their optic axes rotated by 45°, and the orientation of the TN-LCD is directed so as to be consistent with the polarization direction of the exit beam from the retardation plates. Reflectors 19a, 19b are not limited to reflection mirrors of aluminum, but may be glass substrates coated with other vapor-deposited metal or dielectric multilayer film. Using total reflection prisms as reflectors 19a, 19b provides an improved reflectivity.

Figure 6:
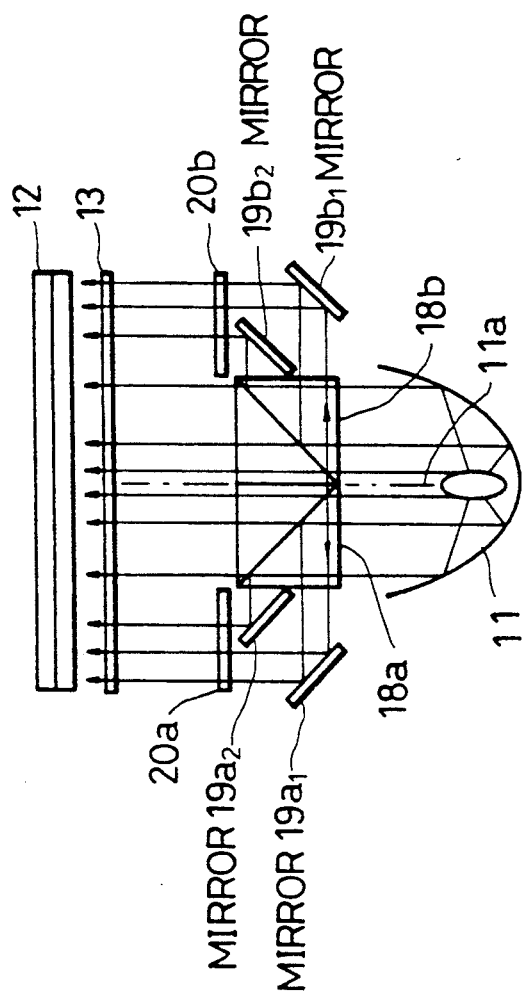
FIG. 6 shows a plan view of the second embodiment of the present invention.

FIG. 6 shows a plan view of the second embodiment of the present invention. In this embodiment each reflector is made up of two mirrors ($19a_1$, $19a_2$), ($19b_1$, $19b_2$). Mirrors $19a_1$, $19b_1$ are directed to reflecting near-axis beams, and are disposed farther from optical axis 11a of light source 11, wherein the near-axis beams refer to the projection beams incident on polarization beam-splitters 18a, 18b through the optical paths near optical axis 11a. Mirrors $19a_2$, $19b_2$ are directed to reflecting far-axis beams, and are disposed nearer to optical axis 11a, where the far-axis beams refer to the projection beams incident on polarization beam splitter 18a, 18b through the optical paths farther from optical axis 11a. As a result, the s-components of the intense near-axis beams can illuminate, after optical rotation, the outermost side regions of the oblong incidence surface, and the s-components of the low intense far-axis beams can illuminate, after optical rotation, the inner side regions together with the p-components of the low intense far axis beams by adjusting the orientations of mirrors $19a_2$, $19b_2$, causing uniform illuminance of the incidence surface. Thus, the quality of the projected picture is improved.

Figure 7A:
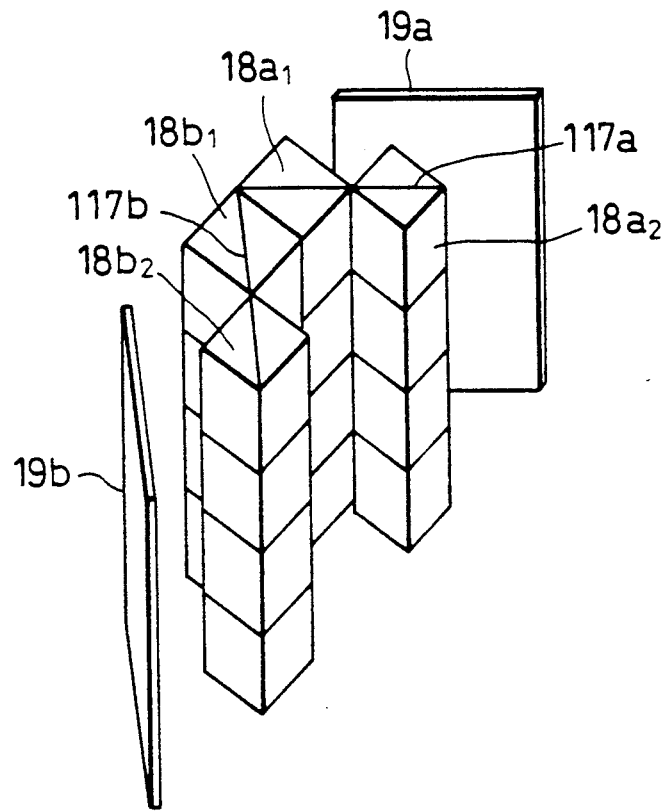
FIGS. 7(A) and (B) are perspective and plan views, respectively, of the polarization beam-splitting optical system to illustrate the third embodiment of the present invention.

FIGS. 7(A) and (B) are perspective and plan views, respectively, of the polarization beam-splitting optical system to illustrate the third embodiment of the present invention (retardation plates not shown). The optical system has a plurality of columns of polarization beam splitters $18a_1$, $18a_2$, $18b_1$, $18b_2$ and mirrors 19a, 19b. Each of the polarization beam splitter columns (PBS columns) is constituted of a plurality of polarization beam splitters (four polarization beam splitter elements in this embodiment) stacked vertically so that the polarization beam-splitting planes of the polarization beam splitter elements make a vertical plane. Hereafter, the vertical plane made up of polarization beam-splitting plane elements (polarization beam-splitting planes of the polarization beam splitter elements) in a PBS column is referred to as a column beam-splitting plane (CBSP). Columns $18a_1$ and $18a_2$ and columns $18b_1$, $18b_2$ are aligned in the horizontal plane so that the CBSPs of columns $18a_1$ and $18a_2$ constitute polarization beam splitting plane 117a, and so that the CBSPs of columns $18b_1$ and $18b_2$ constitute polarization beam splitting plane 117b. Reflectors or mirrors 19a, 19b are arranged in the positions corresponding to those of reflectors 19a, 19b shown in FIG. 4. The constituent parts of the LCD projector other than the polarizing beam-splitting optical system are similar to those shown in FIG. 4.

While the LCD projector of the third embodiment acts in the same way as that of the first embodiment shown in FIG. 4, the advantage is in that volume, and thus the weight of the glass prisms necessary for a given area of the polarization beam-splitting plane are less in the third embodiment than in the first embodiment, resulting in a lighter LCD projector. Further, since it is not easy to obtain a large homogeneous block of optical glass, this embodiment is easier to be worked than the first embodiment shown in FIG. 4.

Figure 8:
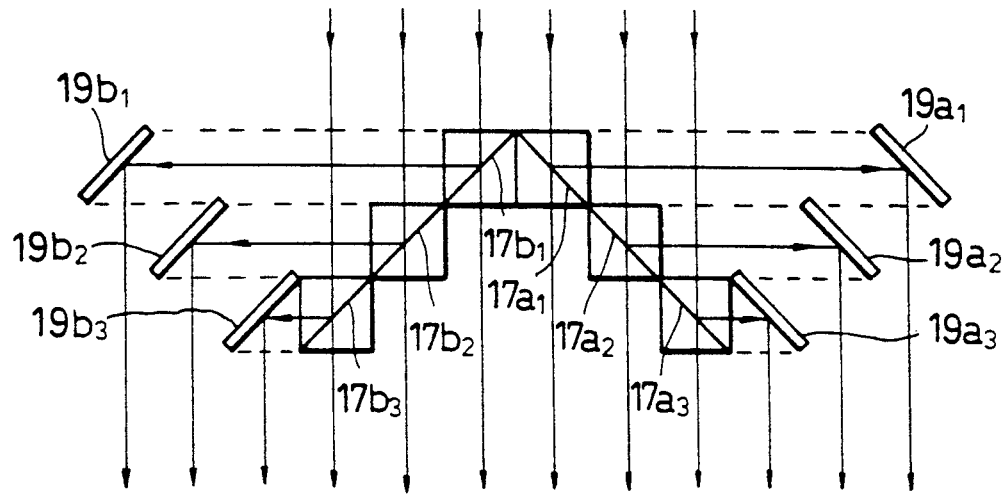
FIG. 8 is a plan view of the polarization beam-splitting optical system to illustrate the fourth embodiment of the present invention.
Figure 9:
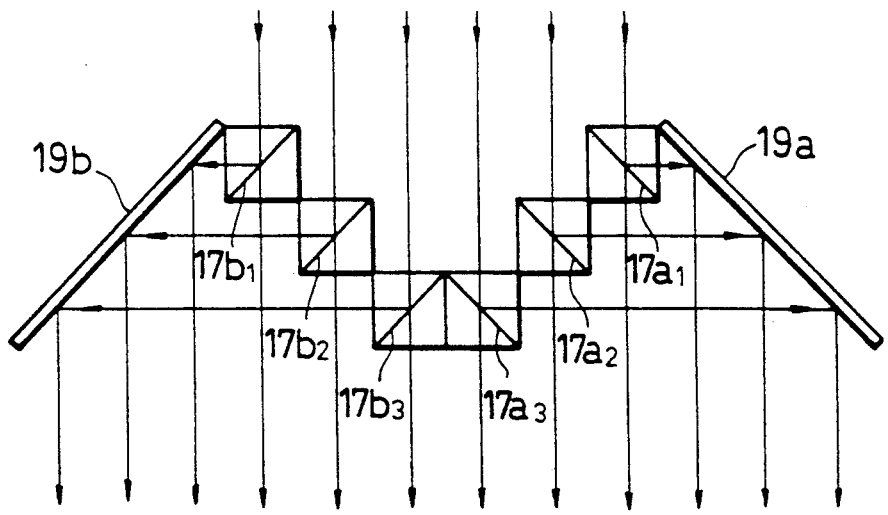
FIG. 9 is a plan view of the polarization beam-splitting optical system to illustrate the fifth embodiment of the present invention.

FIGS. 8 and 9 are plan views of the polarization beam-splitting optical system, which illustrate fourth and fifth embodiments of the present invention, respectively. In the embodiment shown in FIG. 8, each of polarization beam-splitting planes is made of three CBSPs. Two sets of separate mirrors (19$a_1$, 19$a_2$, 19$a_3$), (19$b_1$, 19$b_2$, 19$b_3$) are provided in lieu of mirrors 19a, 19b, each of which serves to reflect the s-polarized components of near-, intermediately-remote- and far-axis projection beams to the outer, intermediate and inner portions of the side regions in the incidence surface of TN-LCD 50, respectively. In this way illuminance distribution on the incidence surface is modified through the arrangement of the mirrors, as is the case shown in FIG. 6.

Figure 7B:
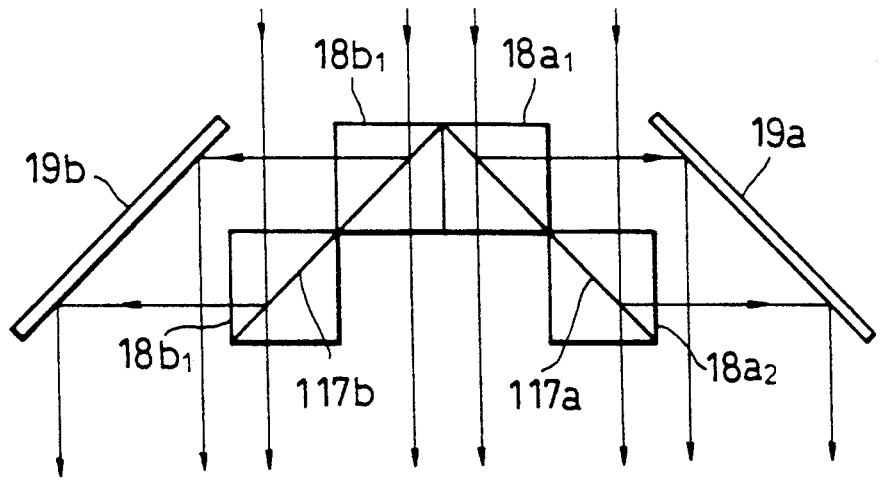

The polarization beam-splitting optical system shown in FIG. 9 is optically equivalent to that shown in FIG. 8. The positions of column beam-splitting planes (CBSPs) 17$a_1$, 17$b_1$, are shifted in the far-axis direction and CBSPs 17$a_3$, 17$b_3$ are shifted in the near-axis direction. Mirrors 19a, 19b are arranged similarly to those of FIG. 7.

It is to be noted that, while the embodiments are set forth assuming a wide image plane of an aspect ratio of 9 : 16, LCD element 12 may have an image plane of any aspect ratio which may be 9 : 16, 3 : 4 (the ordinary TV picture plane), or 4 : 5 (the image plane of a work station). It is important, whatever the aspect ratio is, that the polarization beam splitter or polarization beam splitters and a reflecter or reflecters be arranged correspondingly to the shape of the LCD image plane, and that each reflector be oriented so that the optical path of the s-polarized beam reflected on the reflector impinges on a desired region of the incidence surface of the LCD element, in order to produce uniform illuminance distribution on the incidence surface.

In the first through fifth embodiments, all of the polarization beam-splitting planes have to be oriented with respect to projection beam 22 so as to define planes of incidence parallel to each other in order to ensure parallelism in polarization of the s-polarized beams reflected on the polarization beam-splitting planes and parallelism in polarization of the p-polarized beams transmitted through the polarization beam-splitting planes.

Figure 10:
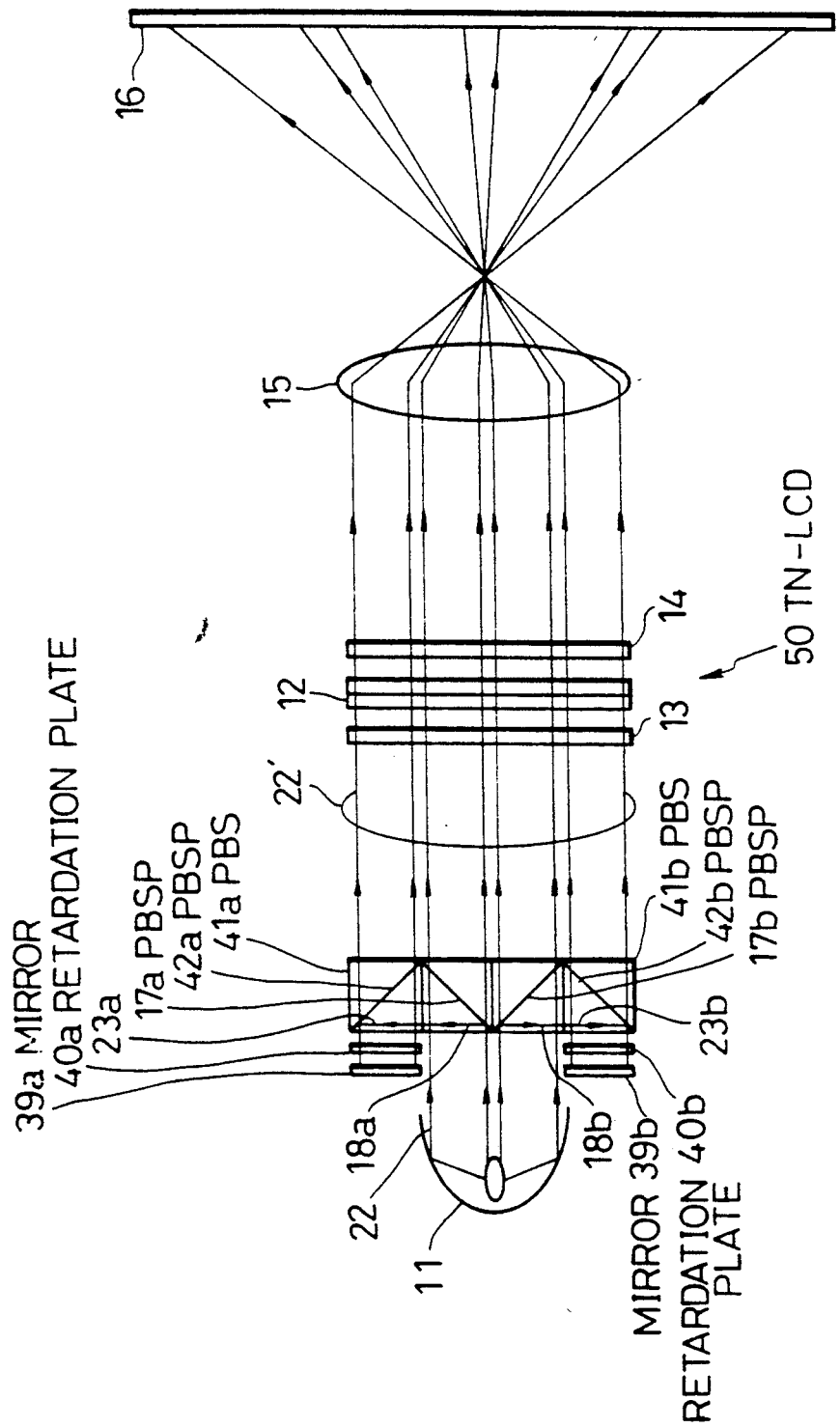
FIG. 10 shows a plan view of polarization beam-splitting optical system to illustrate the sixth embodiment of the present invention.

FIG. 10 is a plan view of the LCD projector of the sixth embodiment of the present invention. In this embodiment, reflectors 19a, 19b and retardation plates 20a, 20b of the first embodiment are replaced with polarization beam splitters 41a, 41b, retardation plates 40a, 40b, and mirrors 39a, 39b. The other components and their arrangements are the same as in the first embodiment.

In this embodiment, polarization beam splitters 18a, 41a, retardation plate 40a and mirror 39a make up a first optical subsystem and polarization beam splitters 18b, 41b, retardation plate 40b and mirror 39b make up the second optical subsystem. As in the first embodiment, the first and second optical subsystems are arranged symmetrically with respect to the plane of symmetry including the optical axis of light source 11, and polarization beam-splitting planes 17a, 17b are oriented with respect to projection beam 22 so as to define the planes of incidence parallel to each other, and so as to define an angle of incidence of 45°.

Polarization beam splitters 41a, 41b are arranged so that polarization beam-splitting planes 42a, 42b are orthogonal to polarization beam-splitting planes 17a, 17b of polarization beam splitters 18a, 18b, respectively. Thus, the plane of incidence defined by the normal of polarization beam-splitting plane 42a and the direction of s-polarized component 23a makes the same plane as the plane of incidence defined by the normal of polarization beam-splitting plane 17a and the direction of projection beam 22. Similarly, the corresponding plane of incidence defined by the normal of polarization beam-splitting plane 42b and the direction of s-polarized component 23b makes the same plane as the plane of incidence defined by the normal of polarization beam-splitting plane 17b and the direction of projection beam 22. Therefore, when projection beam 22 is emitted from light source 11 parallel to its optical axis, s-polarized components 23a, 23b reflected on polarization beam-splitting planes 17a, 17b, respectively, are further reflected by polarization beam-splitting planes 42a, 42b, and thereafter pass along optical paths in the opposite direction of and parallel to projection beam 22. Each of retardation plates 40a, 40b is of quarter-wave plates and is arranged in the optical paths of the s-polarized light reflected by polarization beam-splitting planes 42a, 42b, respectively, so that the optic axis of each of retardation plates 40a, 40b makes an angle of 45° to the direction of polarization of the s-polarized component. Accordingly, the s-polarized beam is converted into a circularly polarized beam, and delivered from each retardation plate 40a, 40b. The circularly polarized light is reflected in the opposite direction by each of mirrors 39a, 39b, and incident again on each retardation plate 40a, 40b, through which it is converted into the p-polarized beam. The p-polarized beam then passes through each of polarization beam splitters 41a, 41b, and is incident on polarizer 13. In this manner, the s-polarized component as well as the p-polarized component of projection beam 22 contribute to the projection of the image displayed by LCD element 12.

Figure 11A:
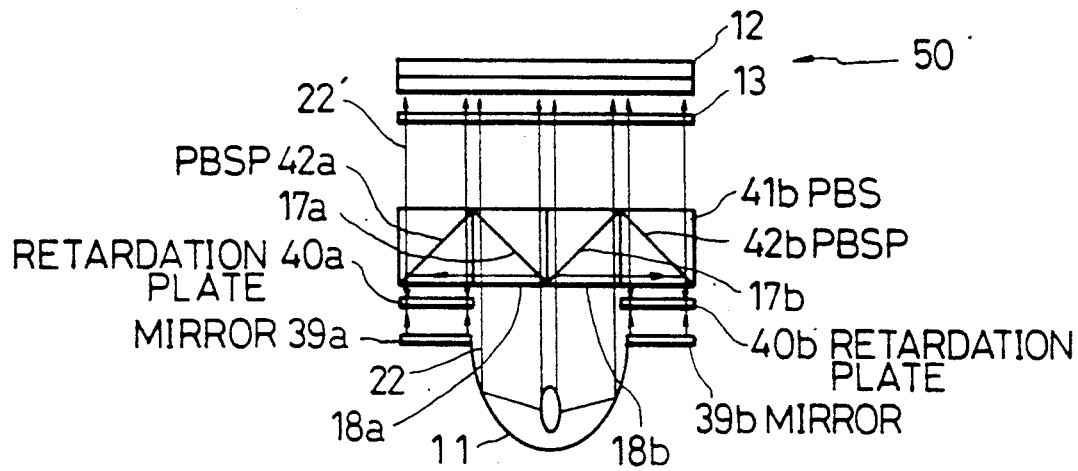
FIG. 11(A) is a plan view of the part of the device between light source 11 and LCD element 12.
Figure 11B:
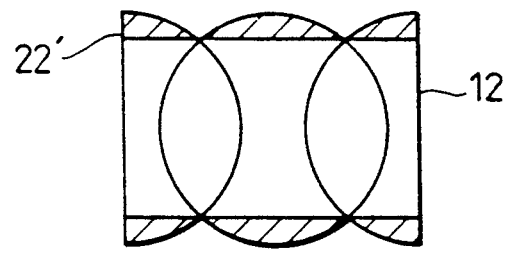
FIG. 11(B) shows a cross section of projection beam 22, on the incidence surface of TN-LCD 50.
Figure 11C:
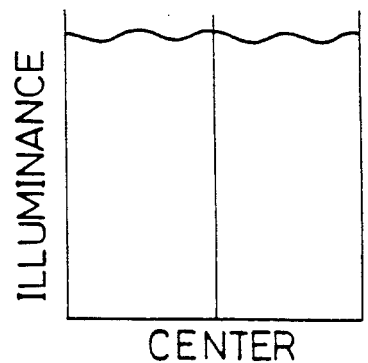
FIG. 11(C) shows the illuminance distribution curve on the incidence surface of TN-LCD 50.

FIGS. 11(A) through (C) show diagrams illustrating the manner in which the LCD projector shown in FIG. 10 operates. FIG. 11(A) is a plan view of the part of the device between light source 11 and LCD element 12. FIG. 11(B) shows a cross section of projection beam 22' on the incidence surface of TN-LCD 50. FIG. 11(C) shows the illuminance distribution curve of the incidence surface of TN-LCD 50.

As can be seen from FIG. 11(A), the s-polarized beam of projection beam 22 emitted from light source 11 is converted into a p-polarized beam to illuminate the side regions of TN-LCD 50. Thus, projection beam 22' has an oblong cross section after it exits from the polarization beam-splitting optical system, as shown in FIG. 11(B). In FIG. 11(B), the hatched areas are parts of the projection beam that is not impinged on the incidence surface of TN-LCD 50. The ratio of the unhatched area to the total cross sectional area of projection beam 22' is larger than those shown in FIG. 3(B), indicating an increase in the light-utilization efficiency of projection beam 22. As shown in FIG. 11(A), since the s-polarized component of the intense central region of projection beam 22 illuminates the side regions of the incidence surface, the illuminance distribution of the incidence surface is more uniform than that shown in FIG. 3(C).

Figure 12:
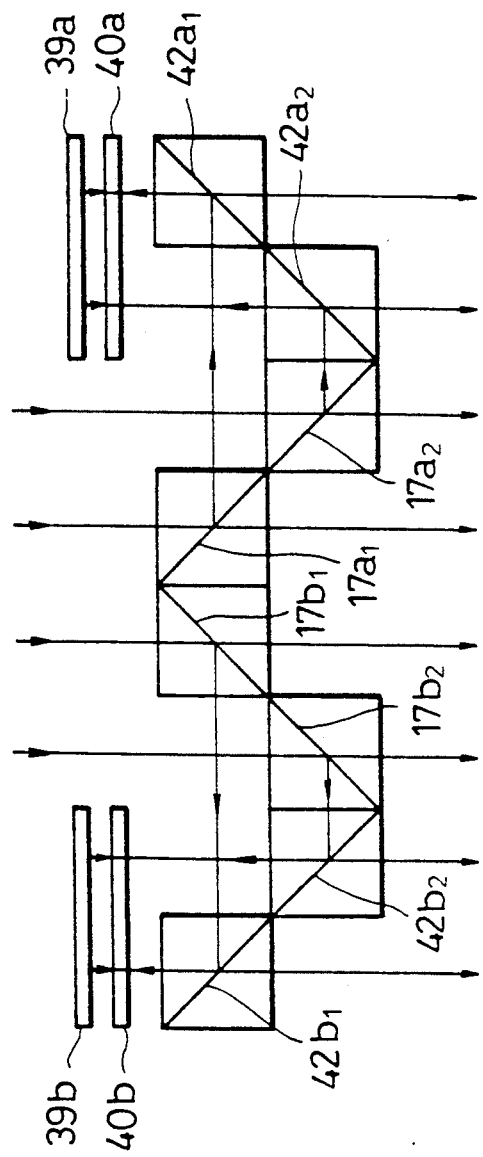
FIG. 12 is a plan view of the seventh embodiment of the present invention.

FIG. 12 is a plan view of the seventh embodiment of the present invention. In this embodiment, the polarization beam-splitting plane corresponding to each of polarization beam-splitting planes 17a, 17b, 42a, 42b in FIG. 10 is made up of a plurality of column beam-splitting planes. For simplicity of explanation, an embodiment will be described in which each of polarization beam-splitting planes 17a, 17b, 42a, 42b consists of two column beam-splitting planes ($17a_1$, $17a_2$), ($17b_1$, $17b_2$), ($42a_1$, $42a_2$), ($42b_1$, $42b_2$), respectively. The operation of this embodiment is quite similar to that of the sixth embodiment shown in FIG. 10. The advantage of this embodiment, however, is that the volume and thus the weight of the glass prisms necessary for a given area of the polarization beam-splitting plane are less than those of the sixth embodiment, and that, since it is not easy to obtain a large homogeneous block of optical glass, the LCD projector of this embodiment is easier to be worked.

Figure 13:
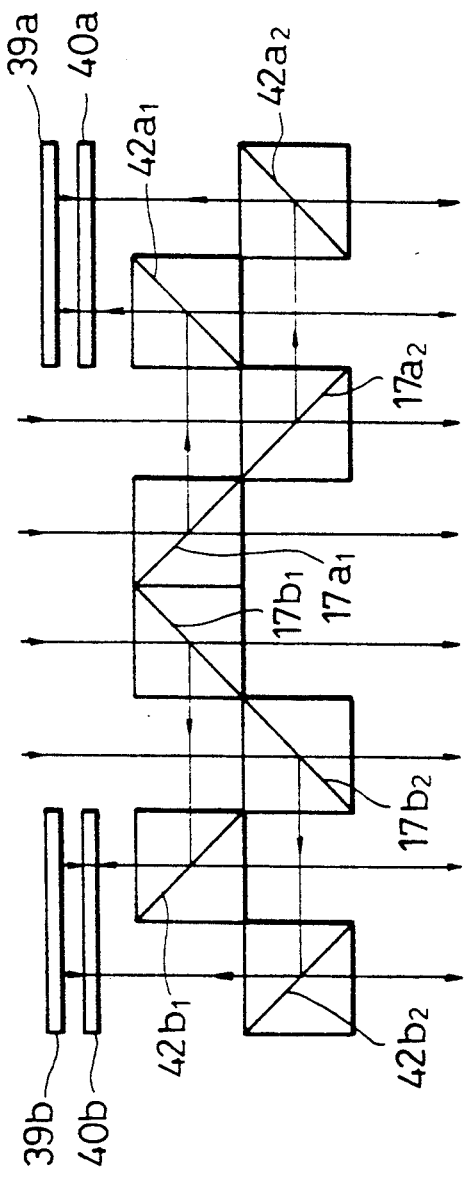
FIG. 13 is a plan view of the eighth embodiment of the present invention.
Figure 14:
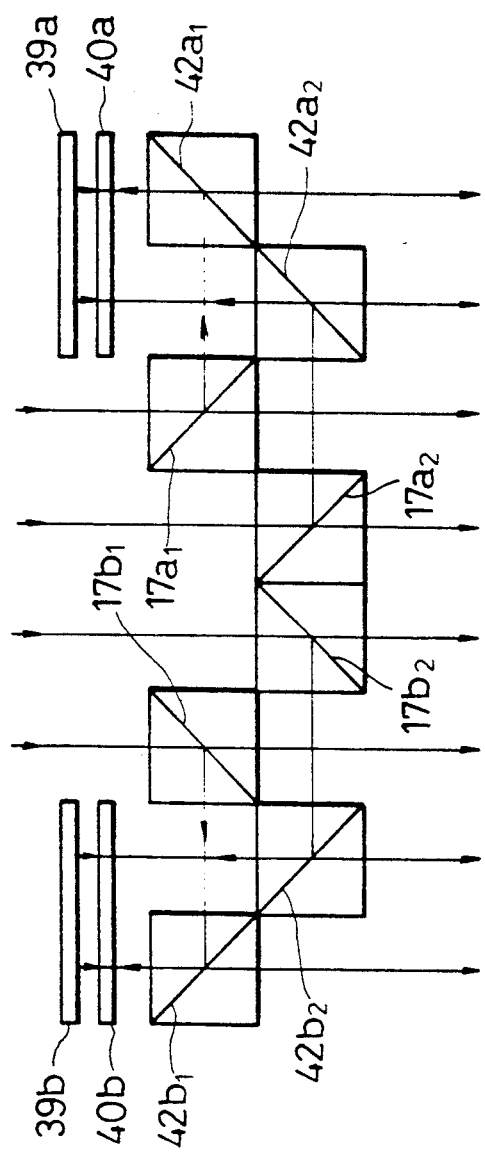
FIG. 14 is a plan view of the ninth embodiment of the present invention.

FIGS. 13 and 14 are plan views of the eighth and ninth embodiments of the present invention. These embodiments are variations of the seventh embodiment shown in FIG. 12. In FIG. 13, CBSPs $42a_1$, $42b_1$ are shifted to the near-axis direction from standard arrangement $42a_1$, $42b_1$, respectively, shown in FIG. 12, while CBSPs $42a_2$, $42b_2$ are shifted to the far-axis direction. In the embodiment shown in FIG. 14, by contrast, CBSPs $17a_1$, $17b_1$ are shifted to the far-axis direction from the standard positions shown FIG. 12, while CBSPs $17a_2$, $17b_2$ are shifted to the near-axis direction. These two embodiments are optically equivalent and attain the same effect.

In the sixth through ninth embodiments, it is important that the polarization beam splitters be arranged corresponding to the shape of the LCD image plane so as to promote light-utilization efficiency and that the polarization beam splitters be arranged so as to produce uniform illuminance distribution on the incidence surface.

Further, polarization beam-splitting planes $17a_1$, $17a_2$, $17b_1$, $17b_2$ (the first polarization beam-splitting planes) have to be oriented with respect to projection beam 22 so as to define planes of incidence (the first planes of incidence) parallel to each other, and each of polarization beam-splitting planes $42a_1$, $42a_2$, $42b_1$, $42b_2$ (the second polarization beam-splitting planes) corresponding to $17a_1$, $17a_2$, $17b_1$, $17b_2$, respectively, has to be oriented with respect to the incident s-polarized beam so as to define the second plane of incidence identical with the first plane of incidence for the corresponding first polarization beam-splitting plane.

While preferred embodiments of the invention have been disclosed, it will be clear that the invention lends itself to numerous modifications. For example, the material of the halfwave plates or quarter-wave plates used as the retardation plates is not limited to polyvinyl alcohol film, but may be polycarbonate, polystyrene, or other polymeric film. Further, more effective optical rotation can be attained by means of a plurality of halfwave or quarter-wave plates with their optic axes angularly shifted in order to compensate for wavelength dependence of birefringence. The light source may be a highly bright white light source such as a xenon lamp, a halogen lamp, or the like, as well as the metal halide lamp described. The liquid crystal may be of any type capable of controlling rotation of the plane of polarization in order to form an image, such as a supertwisted nematic liquid crystal, a ferroelectric liquid crystal, a birefringence control liquid crystal, or the like, as well as the TN liquid crystal described. The liquid crystal drive system is not limited to the active matrix system, but may be a passive matrix system of multiplex drive. The LCD projector may be applied to a monochromatic display, to a color display by means of built-in color filters, or to a color display by means of time-divisional display of red, green and blue.

Further, the LCD projector is applicable to the optical system in which the projection beam from the light source is separated into three colors of red, green and blue by dichroic mirrors or dichroic prisms, in which LCD elements are disposed in the optical paths of the red, green, and blue lights, and in which the color images displayed by the LCD elements are synthesized into a color image.

All of these modifications will be obvious to those skilled in the art and are embraced within the invention herein. Accordingly, it is intended that the present invention be limited only by the scope of the appended claims.

What is claimed is:

1. An LCD projector for projecting an image displayed on an LCD of the electrooptic-effect type on a projection screen, including a polarization beam-splitting optical system disposed in the optical path of a parallel projection beam between a light source and said LCD, wherein said LCD refers to a liquid crystal display, said polarization beam-splitting optical system comprising a plurality of optical subsystems and at least one means for optical rotation, each of said optical subsystems having reflector means and polarization beam splitter means provided with polarization beam-splitting plane means, said polarization beam-splitting plane means transmitting a p-polarized component and reflecting an s-polarized component of an incident beam, and said reflector means being disposed outside said optical path of said projection beam and arranged so as to deflect the optical path of said s-polarized component reflected on said polarization beam-splitting plane means to a prescribed region of the incidence surface of said LCD, said plurality of optical subsystems being arranged so that said polarization beam-splitting plane means included therein are disposed in said optical path of said projection beam and oriented with respect to said projection beam so as to define planes of incidence parallel to each other, and said means for optical rotation being disposed between said plurality of optical subsystems and said LCD and optically rotating at least one of said s-polarized component and said p-polarized component to make parallel the directions of polarization of the two components emerging from said plurality of optical subsystem.

2. An LCD projector according to claim 1, wherein said polarization beam splitter means is a single polarization beam splitter.

3. An LCD projector according to claim 1, wherein said polarization beam splitter means is made up of a plurality of polarization beam splitters and said polarization beam-splitting plane means is made up of a plurality of polarization beam-splitting plane elements, the polarization beam-splitting plane element referring to a polarization beam-splitting plane belonging to a polarization beam splitter.

4. An LCD projector as claimed in claim 3, wherein said polarization beam-splitting plane means is a polarization beam-splitting plane made up of a plurality of said polarization beam-splitting plane elements.

5. An LCD projector as claimed in claim 3, wherein said polarization beam-splitting plane means is made up of a plurality of polarization beam-splitting planes arranged parallel to each other, each polarization beam-splitting plane being constituted by at least one polarization beam-splitting plane element.

6. An LCD projector as claimed in claim 1, wherein said reflector means is a single reflector.

7. An LCD projector as claimed in claim 1, wherein said reflector means is made up of a plurality of reflectors.

8. An LCD projector as claimed in claim 1, wherein said plurality of optical subsystems is two optical subsystems arranged symmetrically with respect to a plane of symmetry including the axis of said projection beam.

9. An LCD projector as claimed in claim 8, wherein said polarization beam-splitting plane means is oriented with respect to said projection beam so as to define an angle of incidence of 45°.

10. An LCD projector for projecting an image displayed on an LCD of the electrooptic-effect type on a projection screen, including a polarization beam-splitting optical system disposed in the optical path of a parallel projection beam between a light source and said LCD, wherein said LCD refers to a liquid crystal display, said polarization beam-splitting optical system comprising a plurality of optical subsystems, each of said optical subsystems having first polarization beam splitter means provided with first polarization beam-splitting plane means which transmits a p-polarized component and reflecting an s-polarized component of an incident beam, said first polarization beam-splitting plane means being disposed in said optical path of said projection beam and oriented with respect to said projection beam so as to define a predetermined first plane of incidence, second polarization beam splitter means provided with second polarization beam-splitting plane means disposed outside said optical path of said projection beam and arranged in the optical path of said s-polarized component of said projection beam reflected on said first polarization beam-splitting plane means, said second polarization beam-splitting plane means being oriented with respect to said optical path of said s-polarized component so as to define a second plane of incidence parallel to said first plane of incidence, means for optical rotation capable of optically rotating an incident light beam by 90° when said incident light beam transmits both ways through said means for optical rotation, said means for optical rotation being disposed in the optical path of said s-polarized component reflected on said second polarization beam-splitting plane means, reflector means for reflecting the light beam transmitted through said means for optical rotation again to said polarization beam-splitting plane means through said means for optical rotation, said reflector means being arranged so that the plane of reflection of said light beam is parallel to said second plane of incidence.

11. An LCD projector according to claim 10, wherein said first polarization beam splitter means is a single polarization beam splitter.

12. An LCD projector according to claim 10, wherein said polarization beam splitter means is made up of a plurality of polarization beam splitters, and said polarization beam-splitting plane means is made up of polarization beam-splitting plane elements, the polarization beam-splitting plane element referring to a polarization beam-splitting plane belonging to a polarization beam splitter.

13. An LCD projector as claimed in claim 12, wherein said first polarization beam-splitting plane means is a polarization beam-splitting plane made up of a plurality of said polarization beam-splitting plane elements.

14. An LCD projector as claimed in claim 12, wherein said first polarization beam-splitting plane means is made up of a plurality of polarization beam-splitting planes arranged parallel to each other, each polarization beam-splitting plane being constituted of at least one polarization beam-splitting plane element.

15. An LCD projector as claimed in claim 10, wherein said second polarization beam splitter means is a single polarization beam splitter.

16. An LCD projector as claimed in claim 10, wherein said second polarization beam-splitting plane means is made up of a plurality of polarization beam-splitting planes, each having a normal oriented so as to define said second plane of incidence.

17. An LCD projector as claimed in claim 10, wherein said plurality of optical subsystems is two optical subsystems arranged symmetrically with respect to a plane of symmetry including the optical axis of said projecting beam.

18. An LCD projector as claimed in claim 17, wherein said first polarization beam-splitting plane means is oriented with respect to said projection beam so as to define an angle of incidence of 45°.

* * * * *